United States Patent
Li

(10) Patent No.: US 11,073,461 B2
(45) Date of Patent: Jul. 27, 2021

(54) DIGITAL HOLOGRAPHY WITH AN INTERNAL IMPACTOR FOR PARTICLE IMAGING, CLASSIFICATION, AND MASS DENSITY CHARACTERIZATION

(71) Applicant: Nanozen Industries Inc., Vancouver (CA)

(72) Inventor: Jingwen Li, Vancouver (CA)

(73) Assignee: Nanozen Industries Inc., Vancouver (CA)

( * ) Notice: Subject to any disclaimer, the term of this patent is extended or adjusted under 35 U.S.C. 154(b) by 85 days.

(21) Appl. No.: 16/670,953

(22) Filed: Oct. 31, 2019

(65) Prior Publication Data

US 2020/0132581 A1  Apr. 30, 2020

Related U.S. Application Data

(60) Provisional application No. 62/753,099, filed on Oct. 31, 2018.

(51) Int. Cl.
*G01N 15/02* (2006.01)
*G03H 1/04* (2006.01)
*G03H 1/00* (2006.01)

(52) U.S. Cl.
CPC ....... *G01N 15/0227* (2013.01); *G03H 1/0443* (2013.01); *G03H 2001/005* (2013.01); *G03H 2001/045* (2013.01); *G03H 2001/0447* (2013.01)

(58) Field of Classification Search
CPC ............. G01N 15/0227; G01N 1/2208; G01N 2015/1454; G01N 2015/1497; G01N 15/0255; G01N 15/1468; G01N 2015/0046; G01N 15/0612; G03H 1/0443; G03H 2001/045; G03H 2001/005; G03H 2001/0447; G03H 2001/0033

See application file for complete search history.

(56) References Cited

U.S. PATENT DOCUMENTS

2020/0103328 A1\* 4/2020 Ozcan ................ G01N 15/0255

OTHER PUBLICATIONS

Gorner, P. et al., "Workplace aerosol mass concentration measurement using optical particle counters", J. Environ. Monit., 14, 420, 2012.
Belosi, F. et al., "Particle deposition within the inertial spectrometer", Journal of Aerosol Science, pp. 37-42, 1987.
Ambient (outdoor) air quality and health, http://who.int/mediacentre/factsheets/fs313/en/, May 2, 2018.

\* cited by examiner

*Primary Examiner* — Hwa Andrew Lee
(74) *Attorney, Agent, or Firm* — Oyen Wiggs Green & Mutala LLP

(57) ABSTRACT

A method and apparatus for monitoring particulate concentrations in ambient air use digital in-line holography and automated digital algorithms to classify and determine mass density and other characteristics of particles within a determined mass and size range. An embodiment provides a sampling plate on which particles are deposited at locations which depend on sizes and masses of the particles. A digital in-line hologram of the sampling plate is processed to obtain information about the particles. The method and apparatus have example application to environmental monitoring.

5 Claims, 5 Drawing Sheets

DIGITAL HOLOGRAPHY WITH AN INTERNAL IMPACTOR FOR PARTICLE IMAGING, CLASSIFICATION, AND MASS DENSITY CHARACTERIZATION

CROSS-REFERENCE TO RELATED APPLICATIONS

This application claims the benefit under 35 U.S.C. § 119 of U.S. application No. 62/753,099 filed 31 Oct. 2018 and entitled DIGITAL HOLOGRAPHY WITH AN INTERNAL IMPACTOR FOR PARTICLE IMAGING, CLASSIFICATION, AND MASS DENSITY CHARACTERIZATION which is hereby incorporated herein by reference for all purposes.

FIELD OF THE INVENTION

The present invention relates generally to environmental monitoring systems and specifically to air monitoring systems which can perform real-time monitoring of particles in ambient air. Particle concentrations, mass density of particles, and/or other particle statistics may be monitored. Some embodiments provide portable hand-held particulate monitors.

BACKGROUND OF THE INVENTION

Rapid and accurate monitoring of particle size, particle distribution, and mass density of particles is important in many fields including aerosol science, the food industry, pharmaceutics, medicine, and environmental monitoring. See e.g. Ambient (outdoor) air quality and health. Available at: http://www.who.int/mediacentre/factsheets/fs313/en/retrieved Aug. 11, 2018.

Currently, monitoring of particles is routinely performed at designated air sampling and analysis stations. Many of these stations include advanced automatic platforms which apply either beta-attenuation monitoring (BAM) or a tapered element oscillating microbalance (TEOM) instrument to monitor particles. See e.g. G. Claus, B. Irene, Handbook of particle detection and imaging, (Springer, 2012) and P. Kulkarni, P. A. Baron, K. Willeke, Aerosol measurement principles techniques and applications, (John Wiley & Sons Inc, 2011). While these devices offer high accuracy and high throughputs in particle measurements, they have many disadvantages including heavy weight, large size, high cost, and complicated maintenance. Most of the current detection methodologies for food particles or microorganisms are based on grab sample and analysis, which are typically performed after food production. This technique offers only a partial solution for optimizing and monitoring the changes in food particles during production.

Another category of commercially available particle measurement instruments is based on light scattering. See e.g. Peter Gorner, X. Simon, D. Bemera, et al. "Workplace aerosol mass concentration measurement using optical particle counters," J. Environ. Monit., 14, 420, (2012). Optical particle counters may enable simultaneously sizing and counting particles in real time with relatively low cost. In these instruments, a light beam intersects a channel carrying an aerosol. The scattering intensity of the light by each particle is then correlated to the size of the particle. The merits of such sensors are simplicity in the sensing configuration and compactness in size. Although they enable the sizing and counting of particles in real-time, such sensors suffer from many disadvantages. One drawback is that such optical sensors are, inherently, unable to detect coincidence (i.e., when two particles are present in the sensing volume at the same time, the particles tend to be counted as one, possibly larger, particle). This imposes a limit on the dynamic range of the particle measurement. Therefore, accurate measurement of high concentrations of particles is a challenge for these devices. Additionally, the scattering cross-section depends on the morphology and refractive properties of the particles. This can cause severe errors in the conversion of the scattered light intensities into actual particle sizes. Finally, none of these products offer a direct measure (i.e., a microscopic image of the captured particles).

There is an increasing need for ways to rapidly monitor the mass density of particles in various industries. Most currently available portable particle counters and sensors based on laser scattering are unable to measure the mass density of particles.

Particle statistics are typically measured by using portable samplers that employ various processes, such as filtering, impaction, or impingement. The collected particle samples are then analyzed and inspected manually, under a microscope by a specialized technician. This type of microscopic analysis can provide accurate particle sizing and counting, and recognition of particle shape and type. This approach, however, is labor-intensive and suffers from high overall cost. Furthermore, since the sampling and inspection processes are separated (i.e., the sampling is performed in the field, whereas the sample analysis is conducted in a laboratory), this causes significant delays in the reporting of the results and limits its application for on-site monitoring. Also, bench-top microscopes are cumbersome, heavy, and require specialized skills to operate. Furthermore, the existing commercial particle sensors that are widely used in monitoring airborne particulates have many limitations when addressing food particles.

There remains a need for practical compact sensors that are operable to measure particle mass density and/or other particle properties.

SUMMARY

The present invention provides methods and apparatus for monitoring particles. The methods and apparatus may be applied for one or more or all of detecting airborne particles, determining particle size, distribution, counting particles, estimating the particle mass density, determining particle statistics, determining particle shapes, and/or estimating refractive indexes of particles. In some embodiments, such data is obtained in real time. Data and statistics may be presented to a user in an expedient fashion.

One aspect of the invention provides a system that can be viewed essentially as an inertial impactor configured as in an in-line digital holograph microscopy platform, controlled by a micro-processor with image processing capabilities, and memory unit.

The impaction-based air sampler comprises an acceleration nozzle, i.e., the interior walls of the nozzle slope inwards towards the nozzle exit, creating a so-called venturi effect which accelerates on the laminar airstream. An exit of the nozzle faces a sticky semi-transparent sampling plate. The sampling plate is positioned close to an image sensor. For example, the sampling plate may be in contact with the image sensor or spaced from the image sensor by a sub-mm distance. A light source, which may be a lens-less light source comprising a LED and a pin-hole aperture is configured at the inlet of the acceleration nozzle to beam light toward the sticky plate. A micro-pump draws the laminar airstream through the nozzle at high speed. The sticky sampling plate faces the airstream so that particles larger than a cut-off size of the impactor will slip across streamlines of the flow and become immobilized on the sticky plate.

The design of the impactor nozzle width and laminar airflow caused by the micro-pump rate targets specific particle size ranges to be captured and distributed on the sampling plate. The particles are captured at locations on the sampling plate which depend on the mass density and size of the particles. For particles of the same size, at a determined pumping speed, heavier particles tend to be deposited in a central region of the sampling plate, while lighter particles adhere to the sampling plate in peripheral regions. This distribution effect allows for differentiating the masses of similarly sized particles.

The sampler may be used to sample ambient air or aerosol space by activating the micro-pump for a determined length of time. Next, the lens-less light source illuminates the transparent sticky sampling plate, and the optoelectronic sensor array positioned below the sticky sampling plate, captures one or more shadow images of the sticky plate and any objects on it.

In digital in-line holography the reference wave and the object wave share the same optical axis. Interference of light scattered by an object (e.g. a particle) and the reference wave create a so-called hologram at the image plane. The current invention applies digital-in-line holography to overcome problems encountered with capturing a regular digital photograph of the sampling plate where shadows, refractive indices, and other physical properties of the particles result in over or under-estimated size and true shapes of the captured particles.

The resulting digital hologram is then processed to reconstruct a true digital image of the particles captured which are then analyzed to obtain particle statistics including one, more than one, or all of size, count, shape, and distribution. To obtain the particle masses, the particle locations on the sticky plate may be determined and the size of each particle may be correlated to its location based on an expected distribution model of the impactor and air flow.

An example procedure for particle analysis is to compare the captured particles sizes and locations to a calibrated model using the same in-line digital holograph microscopy platform with further laboratory verification for any range of particle sizes and mass as required.

Air sampling and image capturing may be integrated into an automated opto-electronic package, thereby eliminating any need for manual intervention, mechanical calibration, or optical focusing. Two approaches may be used for processing the acquired digital images. In a relatively lower cost unit, acquired images are transferred to a remote processor (e.g. a desktop or cloud processor), which may use readily available image processing software to process the images. In a fully integrated unit the images are processed by an integrated processor. The fully integrated unit can include a display and/or printer for reporting the results and/or a data connection for outputting the results. Statistical data on the size and mass of the captured particles may be obtained using either of these approaches.

Another aspect of the invention provides a sampling plate on which particles are deposited at locations which depend on sizes and masses of the particles. A digital in-line hologram of the sampling plate is processed to obtain information about the particles.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION OF THE INVENTION

Figure 1:
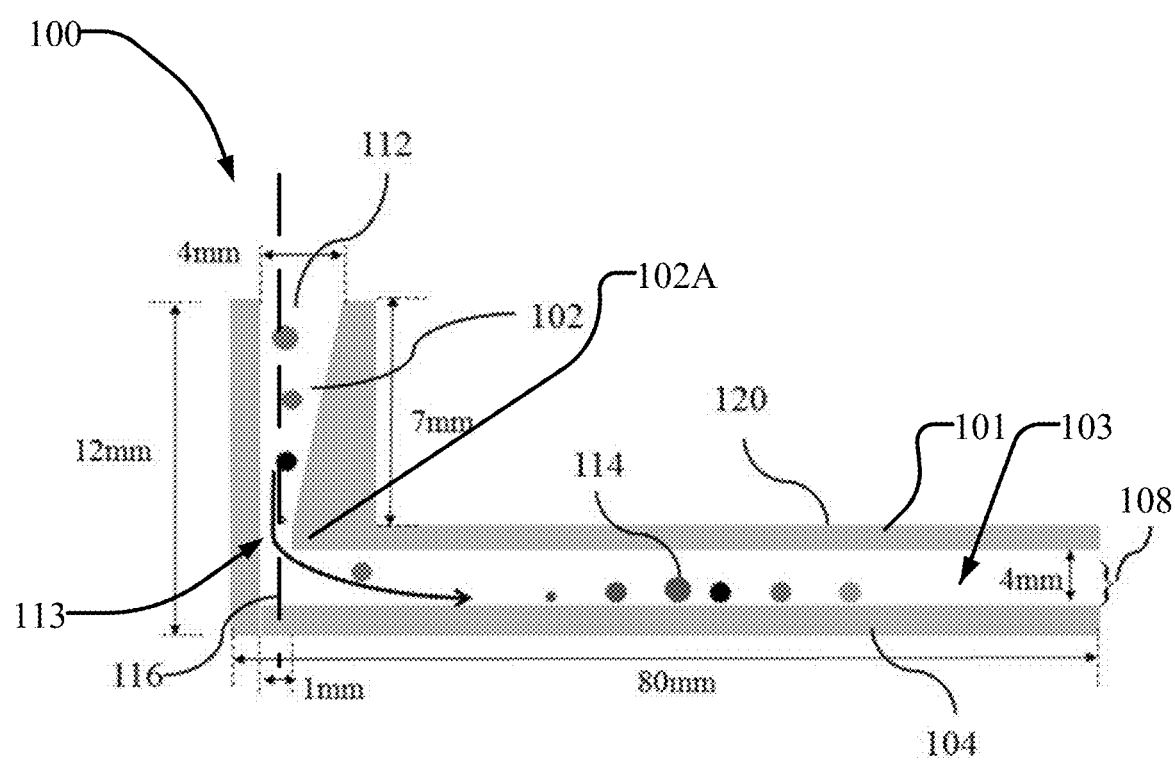
FIG. 1 is a vertical cross-sectional schematic view of an inertial spectrometer and includes a simulated particle distribution on a portion of the inertial spectrometer sampling plate.

FIG. 1 is a simplified view of an inertial spectrometer 100. The essential part of an inertial spectrometer is a venturi section 102. In FIG. 1 venturi section 102 tapers in area toward a smaller constricted end 102A of venturi section 102 which terminates at an upper plate 101. A chamber 103 is formed between the upper plate 101 and a base plate 104. Venturi section 102 may be called an "impactor" since particles carried in the airflow through venturi section 102 may be caused to impact onto base plate 104.

A point 116 of base plate 104 is located on a centerline 112 of venturi section 102. Base plate 104 comprises a prepared sticky surface to capture particles. Base plate 104 may be called a "sampling plate".

The air flow containing particles 114 is drawn through venturi section 102 by a micro-pump (not shown) for a predetermined period of time. The draw rate of the micro-pump, according to one preferred embodiment of the present invention is 1 ms. The airflow is deflected toward the exit of chamber 103. The flow stream 113 abruptly changes direction when the air that has passed through venturi section 102 impacts on base plate 104 at an impaction area near point 116. The impaction of the airflow on base plate 104 results in the deposition of particles 114 along the sticky base plate 104. For particles of different sizes and masses, the locations of particles 114 on base plate 104 depend on the sizes and masses of particles 114.

When the sampling is completed the sticky base plate 104 can be removed and sent to a laboratory for microscopic and other particle analysis.

The particle bearing laminar air flow is drawn outward from central point 116 toward the outer rim of base plate 104. Heavier particles impact on base plate 104 and are captured closer to point 116 while lighter particles tend to be captured on base plate 104 in the more peripheral region of base plate 104 (toward the exit 108 of chamber 103).

Figure 2:
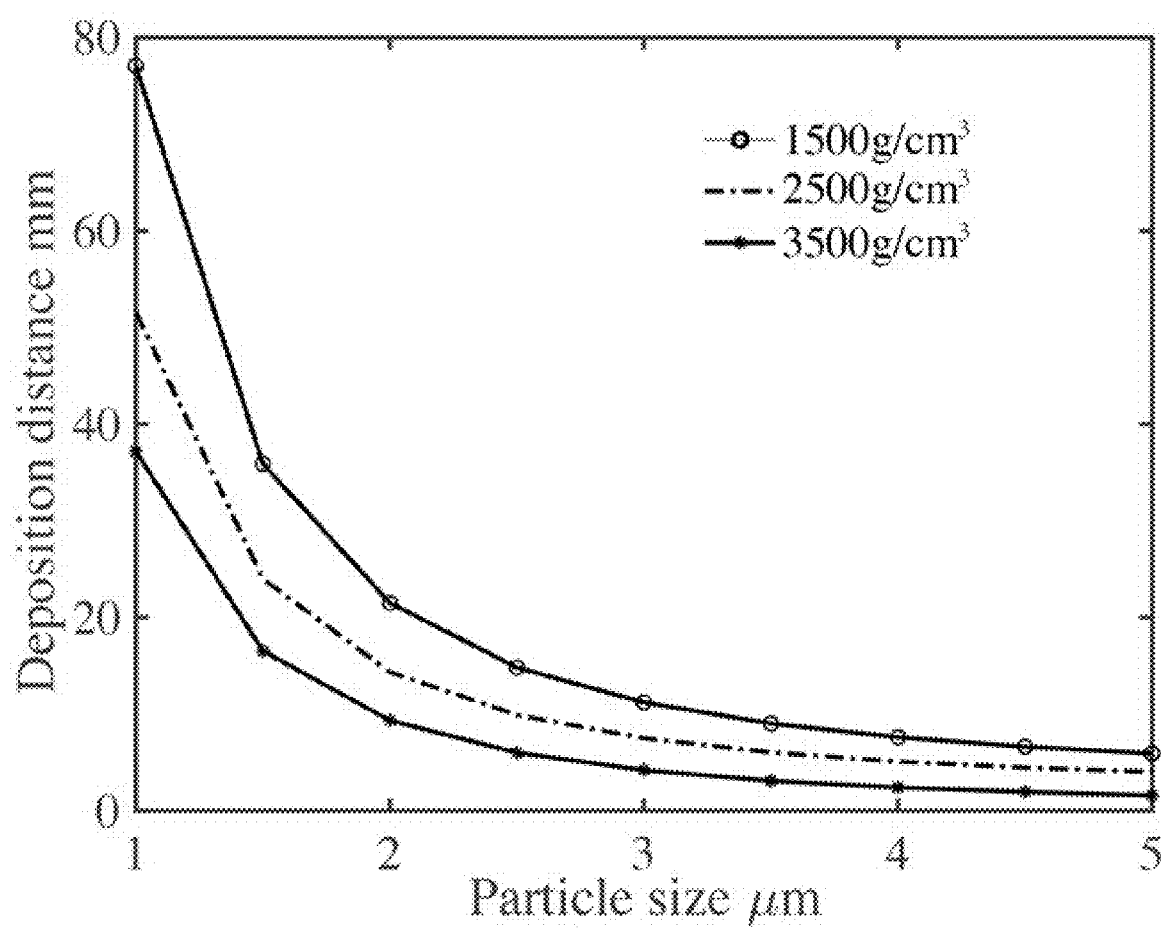
FIG. 2 is a graph of simulated calibration curves of particles of different sizes and mass densities.

FIG. 2 is a graph showing expected deposition location as a function of particle size for simulated particles of different densities. Both the size or diameter of a particle and particle mass density will influence the particle inertia, and consequently the trajectory taken by the particle with the change of direction of airflow which results when the airflow encounters base plate 104 of FIG. 1. As mentioned, particles can be expected to be deposited in a pattern according to their characteristics. Particles with large mass tend to follow an original trajectory due to the effect of inertia and impact more toward point 116 on base plate 104. For particles of the same size, those with a higher mass density, are positioned closer to the impact area around point 116 on sampling plate 104 in FIG. 1. At the same time, for particles of different sizes, the larger particles are positioned closer to center point 116. That is to say, the distribution of particles immobilized on the base plate 104 follows certain rules.

The technique utilized by the present invention may apply inertial spectrometry as described for example in F. Belosi and V. Prodi, Particle deposition within the inertial spectrometer, Journal of aerosol Science, pp. 37-42, 1987, which is hereby incorporated herein by reference for all purposes.

The particle's motion is governed by the second law of Newton, the trajectory of a particle obeys the process that a particle mass multiplied by acceleration equals the force exerted on the particle. In a fluid flow field, each particle will experience the Stokes drag force which results from the relative velocity between particles and the fluid flow field. Two-dimensional motion equations can be described as:

$$\frac{Stk}{2}\cdot\frac{d^2x}{dt^2} = 8xy - \frac{dx}{dt} \qquad \text{Eq. 1}$$

$$\frac{Stk}{2}\cdot\frac{d^2y}{dt^2} = -4y^2 - \frac{dy}{dt}$$

where (x, y) describes the instantaneous location of a particle at time t. The Stokes number (Stk) is a dimensionless number characterizing the behavior of particles suspended in a fluid flow field.

According to fluid-dynamic theory, Stk is dependent on the particle mass density and particle diameter, which are also factors relevant to the particle trajectory and the deposition locations. A particle with a large Stk will tend to impact close to center point 116, while particles with smaller Stk continue to flow with the streamline and are eventually deposited on the collecting plate at a larger radius from center point 116. Stk can be written as:

$$Stk = \frac{Re}{9}\left(\frac{\rho_P}{\rho_a} + \frac{1}{2}\right)\times\left(\frac{d_P}{w}\right)^2 \qquad \text{Eq. 2}$$

$$Re = \frac{\rho_P v w}{u} = \frac{uw}{\gamma}$$

where $\rho_P$ stands for the particle density, $\rho_\alpha$ stands for the density of air mass, $d_p$ stands for the average dimension of a particle, u stands for the average inlet flow speed, w stands for the width of the inlet of chamber 103 and y stands for the kinematic viscosity of air mass, respectively.

FIG. 3 schematically illustrates a more complete sampling apparatus 300 for sampling aerosol particles and for performing digital in-line holography.

Apparatus 300 is operable to obtain information about particles more independently than the basic inertial spectrometer shown in FIG. 1. Apparatus 300 performs the required analytic functions, obviating any need for laboratory microscopy investigation of the base plate 104 carrying particle samples. Apparatus 300 includes a light source 301 comprising an LED 302, preferably, according to one embodiment of the present invention, an RGB LED 302, and a pin hole aperture 304. Light source 301 is positioned to illuminate base plate 104 through a transparent plate 101 and chamber 103. Base plate 104 is transparent.

A CMOS image sensor 310 is configured immediately below base plate 104 and is sensitive to the light beam 303 from the light source 301.

The filtered light from LED 302, after propagating a short distance (e.g. ~4 cm) in air, interacts with the particles 316 that are collected on the sticky sampling plate 104. Each particle 316 scatters, absorbs, and refracts the incoming light based on its size, 3D morphology, and refractive index, as well as its composition. The interference of the light waves that pass through or are scattered by particles 316 with the un-scattered light from light source 301 creates the hologram of each particle 316, which is detected directly using CMOS sensor array 310. In accordance with one embodiment of the present invention CMOS sensor array 301 contains 1.67 μm pixels and has an active area of ~30 $mm^2$.

According to one preferred embodiment, LED 302 is a LED chip, Model: SunLed, XZBGRBBRMER158 W. This LED can emit three wavelengths of light on the same chip. By capturing the images of particles at three wavelengths, we can merge the three images and obtain colorful images of the particles.

Apparatus 300 may apply an expected distribution model for the particles. Such a model may be constructed by introducing particles of known size and mass density into apparatus 300 and observing where those particles are deposited on base plate 104 to build a distribution model, in effect calibrating apparatus 300. Another way to construct such a model is to use a computer fluid dynamic simulation of apparatus 300 to predict where particles having given properties (size, mass, etc.) will be deposited on base plate 104.

FIGS. 4A to 4C illustrate steps in the holographic process. The initial condition of the sticky plate and the adhesion layer used create visual artifacts which should be accounted for and removed. A differential imaging strategy may be used to remove the artifacts. In this strategy, two sets of images are captured and stored. One image is acquired before particle sampling. Another image is obtained after sampling. What follows may be accomplished with the apparatus 300 of FIG. 3.

The first image, the background image 402, depicts the initial state of the sticky plate sampler surface prior to sampling aerosol particles. Light source 301 is illuminated and a first hologram is captured by the image sensor and stored as a background two-dimension matrix H(x,y) in the memory unit associated with a microprocessor.

Next, an aerosol containing particles is sampled by engaging a micro-pump for a pre-determined length of time, after which the micro-pump is disengaged, and the airflow closed to prevent contamination.

Then light source 301 is illuminated again and a second hologram 404 is captured by the image sensor and stored by the microprocessor in memory as a two-dimensional matrix R(x,y). To remove background effects from the R(x,y) image, the H(x,y) background matrix is subtracted from the R(x,y) matrix mathematically. The obtained dataset is considered to be the reconstructed digital particle image 406 I(x,y) is also stored in memory and used for further analysis.

In one embodiment of the present invention, the obtained data set images may be transferred to a separate computing set up for the remainder of the analysis described below. In yet another embodiment, the obtained data set images are completely analyzed by a data processor (e.g. a microprocessor with image processing capabilities) integrated into device 300 as described above. In each case, the processing of the data set images is the same, the latter being more automated and relying on integrated software and display capability, the former may utilize readily available image processing software and statistical display functions.

The particle images U(x,y) may be reconstructed from their differential holograms I(x,y) using free-space digital backpropagation, i.e.

$$ASP[I(x,y);\lambda,n,-z_2]=1+U(x,y) \qquad \text{Eq. 3}$$

Where $\lambda$ is the illumination wavelength, n=1.5 is the refractive index of the medium between the sample and the image sensor planes, $Z_2$ is the approximate distance between the sample and the image plane. ASP[•] operator is the angular spectrum based free-space propagation, which can be calculated by the spatial Fourier transform of the input signal using a fast Fourier transform and then multiplying the result by the angular spectrum filter $H(v_x, v_y)$ (defined over the spatial frequency variables), which is then followed by an inverse Fourier transform.

Note that direct back-propagation of the hologram intensity yields two additional noise terms, twin image and self-interference noise. These terms and artifacts can be removed using phase recovery methods in order to obtain a clean reconstruction. In a preferred reconstruction process, the distance $Z_2$ between the sample and the sensor planes for the measurements here is obtained by scanning in the axial direction; the position when achieving the clearest particle image can be used to determine the $Z_2$ value.

$$H(v_x, v_y; \lambda, n, z_2) = \left\{\exp\left[-j2\pi \cdot \frac{nz_2}{\lambda} \cdot \sqrt{1-\left(\frac{\lambda}{n}v_x\right)^2 - \left(\frac{\lambda}{n}v_y\right)^2}\right]\right\} \qquad \text{Eq. 4}$$

The reconstruction of the hologram is calculated by using the formula (FT and $FT^{-1}$ respectively refer to the FFT transform and the inverse FFT transform):

$$U(x,y) = \qquad \text{Eq. 5}$$
$$FT^{-1}\left[FT(H(v_x, v_y))\exp\left(-j2\pi \cdot \frac{nz_2}{\lambda} \cdot \sqrt{1-\left(\frac{\lambda}{n}v_x\right)^2 - \left(\frac{\lambda}{n}v_y\right)^2}\right)\right]$$

A CMOS image sensor is preferred for real-time monitoring applications due to high speed of image acquisition. Alternative image sensors may be used. For example, the optoelectronic sensor array can be conveniently changed to a charge-coupled device (CCD) when better image signal-to-noise ratio is required due to better light sensitivity. Note that with such a configuration, one can achieve an even wider range of field-of-view to more than, for example, >15 cm$^2$. This constitutes significantly wider imaging areas than that are offered by conventional optical microscopes, which is, therefore, especially ideal for high-throughput characterization of particles.

A particle imaging reconstruction algorithm reconstructs a digital microscopic image of the sampling plate, this can be accomplished via, for example, a Kirchoff-Helmholtz transform. Another process analyzes the digital image to obtain particle statistics including, for example, size, count, shape, and distribution.

Figure 5:
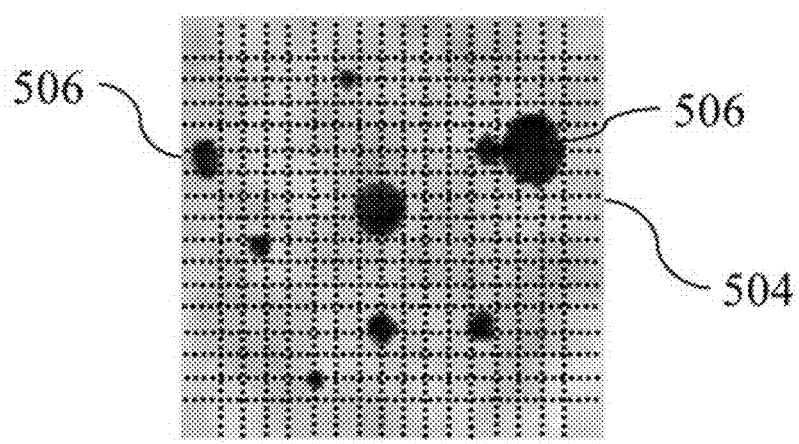
FIG. 5 is a view of a portion of a CMOS image sensor with particles of various sizes and mass.

FIG. 5 shows a portion of a CMOS image sensor 310. The pixels 506 of the image sensor displayed as well as particles 604 of different sizes. Detailed statistics obtained may include any one or more of size, count, shape, mass, and distribution location.

In order to count and size each particle, a microprocessor may run an algorithm similar to the regionprops function in Matlab™ image processing tools. It can be appreciated that once the size of a particle is determined its position relative to the xy axis of the image sensor can be mathematically computed from the center point of the image sensor and the position or distance is determined. Although we have shown in our figures only particles of spherical shape, other particle shapes can also be accommodated by the same algorithm. Once both size and position of each particle is determined each particle is correlated to its location based on the expected distribution model discussed above.

Figure 3:
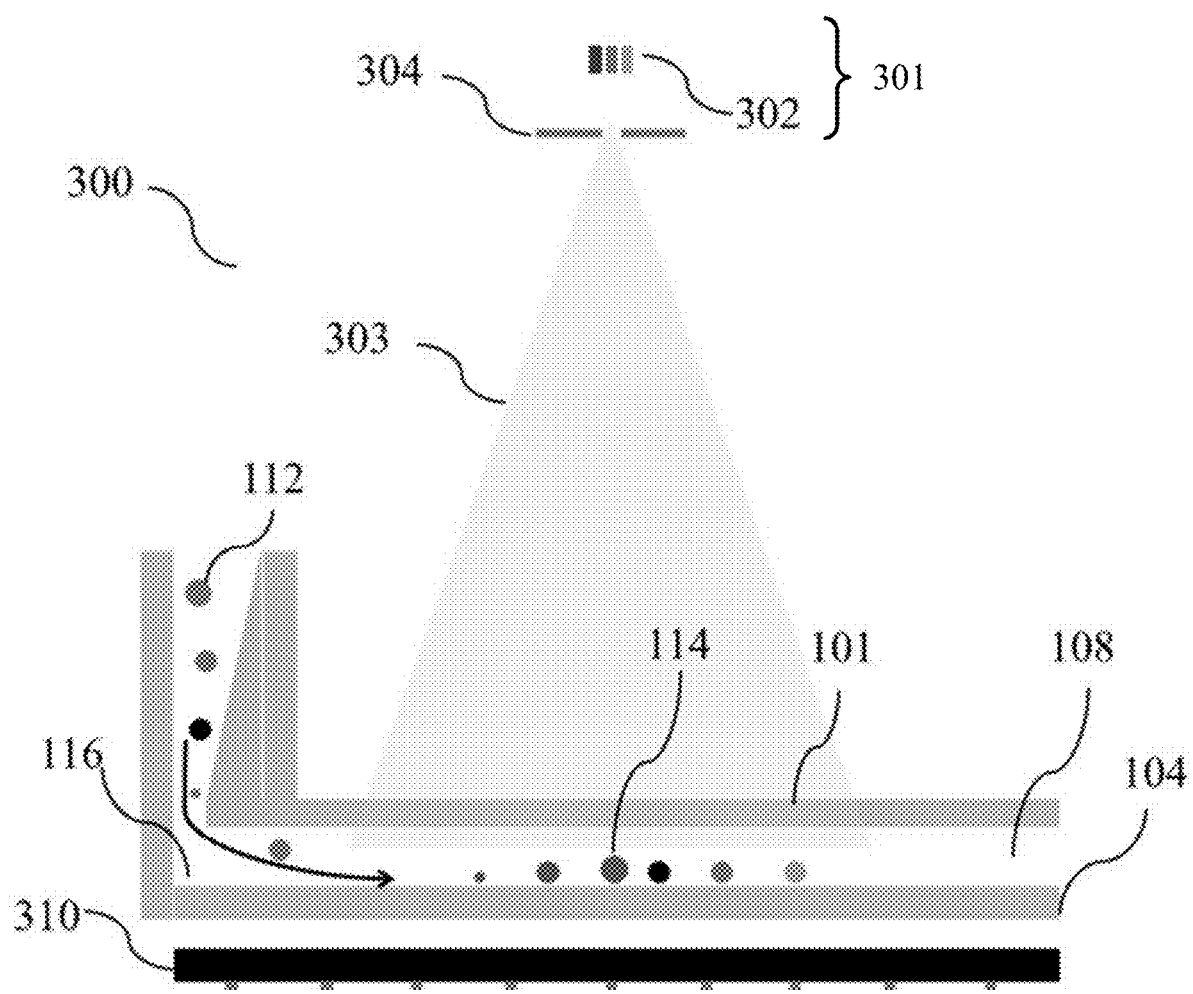
FIG. 3 is a schematic drawing of an impaction-based sampler based on the principles of an inertial spectrometer and the configuration of a lens free in-line digital holography apparatus.
Figure 4A:
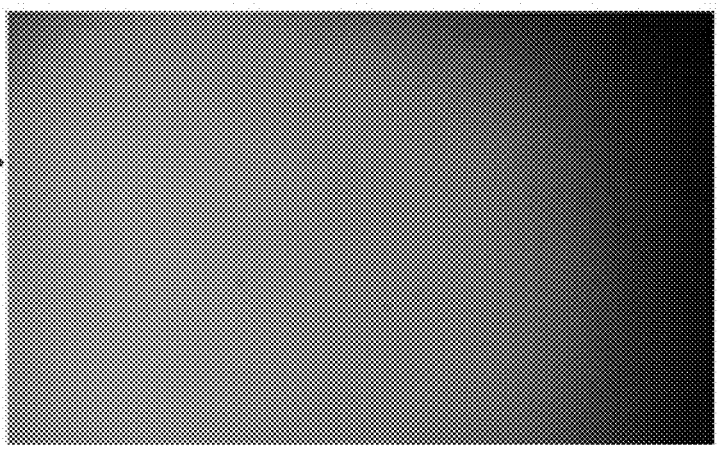
FIGS. 4A to 4C illustrate an image of background, a hologram of captured particles, and a reconstructed image of the captured particles.
Figure 4B:
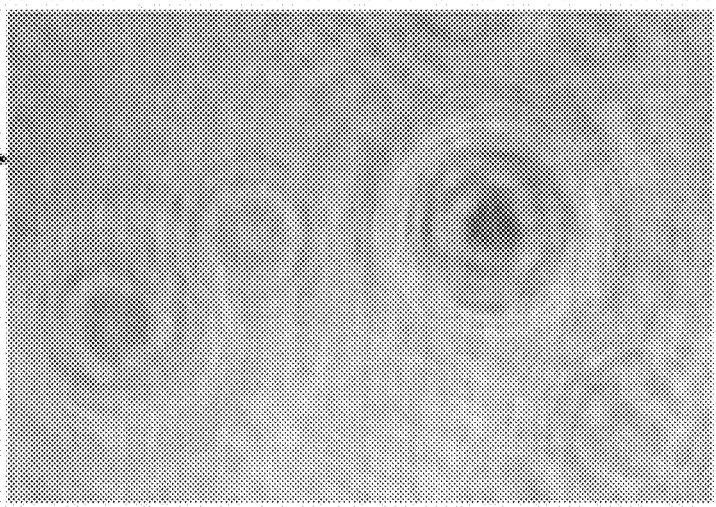
Figure 4C:
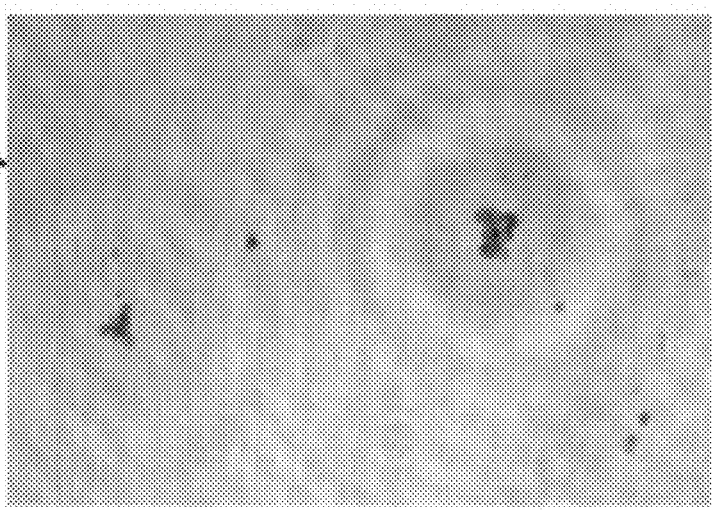

Detailed statistics thus obtained can include size, count, shape, mass, and distribution location. The digital hologram of each cell is extremely rich in particle statistics and permits rapid reconstruction of its microscopic image and other particulate statistics (e.g., size, shape, refractive index, density, distribution). This digital image reconstruction can be conveniently made at a central PC station located in a remote setting or in a preferred embodiment of the current invention by a programmed microcontroller integrated with the lens-free digital holographic sampling apparatus 300 of FIG. 3.

The methods and apparatus described herein may be varied. For example:
  base plate 104 may have any of various shapes when viewed from above;
  airflow in chamber 103 may be radially outward from point 116, may fan out from point 116 through a range of angles, or may flow primarily in one direction along chamber 103.

Interpretation of Terms

Unless the context clearly requires otherwise, throughout the description and the
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may include specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ('PALS"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

The invention may also be provided in the form of a program product. The program product may comprise any non-transitory medium which carries a set of computer-readable instructions which, when executed by a data processor, cause the data processor to execute a method of the invention (e.g. a method for processing holography images to yield information about particles as described herein and/or a method for controlling an apparatus as described herein to sample air or another fluid and provide information about particles in the air or other fluid). Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

Where a component (e.g. a software module, pump, nozzle, CMOS imager, processor, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

I claim:

1. A method for monitoring airborne particles with a micro-processor controlled impaction-based air sampler comprising the steps of:
    capturing a first background image in-line digital hologram of a base plate;
    obtaining a sample of airborne particles, with the further steps of,
        opening an input port of an impaction-based air sampler, flowing air through the impaction-based air sampler, and closing the input port;
        capturing a second particle image in-line digital hologram of the base plate; and
        performing differential imaging by mathematically subtracting the first background hologram from the second particle hologram to obtain a particle image hologram;
    reconstructing a particle image from the particle image hologram;
    performing a scan of the particle image to count and size each particle identified and store size and location;
    registering particle locations; and
    correlating the particle locations to a calibration model to obtain an estimate of the mass of each particle.

2. The method according to claim 1 comprising saving all said particle data for further analysis.

3. The method according to claim 2 including creating a histogram of said particle data.

4. The method of claim 1 where the calibration model is a calibrated empirical model.

5. The method of claim 1 where the calibration model is a simulated model.

\* \* \* \* \*